United States Patent [19]

Coquin

[11] 4,443,061
[45] Apr. 17, 1984

[54] DEVICE FOR HOLDING ACCESSORIES FOR THE LENSES OF APPARATUSES FOR TAKING PHOTOGRAPHS

[76] Inventor: Jean-Claude Coquin, 15, rue Jean Bologne, 75016 Paris, France

[21] Appl. No.: 244,951

[22] Filed: Mar. 18, 1981

[30] Foreign Application Priority Data

Mar. 20, 1980 [FR] France .................. 80 06225

[51] Int. Cl.³ .............................. G02B 7/00
[52] U.S. Cl. ................................. 350/318
[58] Field of Search ............... 350/318, 58, 316

[56] References Cited

U.S. PATENT DOCUMENTS 4,302,078 11/1981 Sfravitz .................. 350/318

FOREIGN PATENT DOCUMENTS 4246 9/1979 European Pat. Off. ......... 350/318

*Primary Examiner*—Jon W. Henry
*Attorney, Agent, or Firm*—Cushman, Darby & Cushman

[57] ABSTRACT

An accessory-holding device for a camera comprising an annular body having an aperture therethrough and having on one side a recess extending in a plane transverse to the plane of the aperture for receiving an edge of an adaptor ring adapted to be screwed into a lens assembly in such a way as to permit rotation of the body relative to the adaptor ring, the body also having at least one pair of grooves, on its side which is opposite the recess, these grooves extending in a plane transverse to the plane of the aperture; and an adapting component having an aperture therethrough, the adaptor component having a first contour for engaging in the recess so as to be held therein with the apertures in alignment, the first contour enabling rotation of the adapting component about the axis of the aligned apertures, and the adaptor plate having a second contour for engaging in the pair of grooves so as to be held therein, the second contour enabling sliding movement of the adapting component transversely of the axis of the apertures.

7 Claims, 6 Drawing Figures

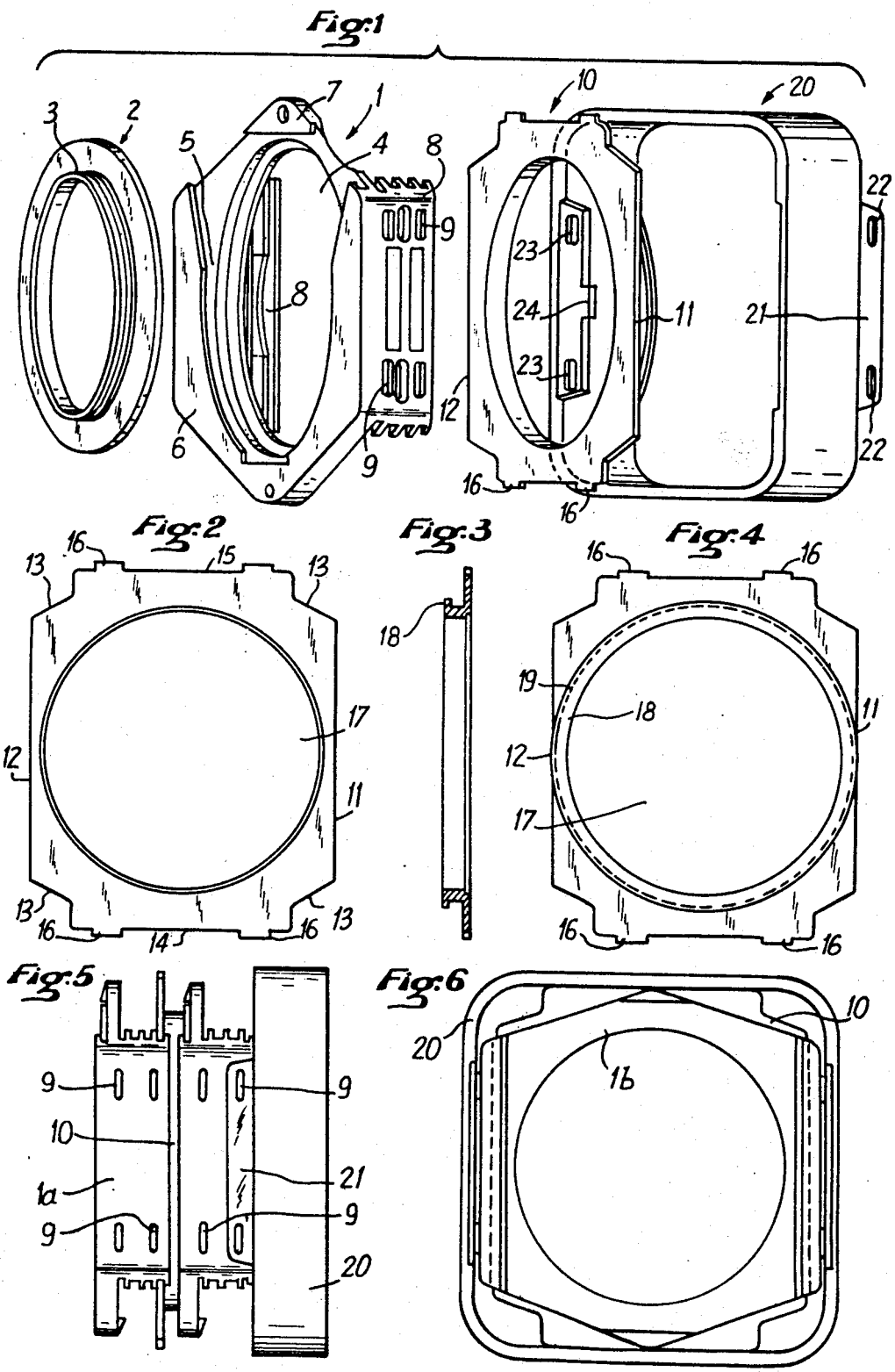

DEVICE FOR HOLDING ACCESSORIES FOR THE LENSES OF APPARATUSES FOR TAKING PHOTOGRAPHS

This invention relates to an accessory-holding device for still cameras, mainly characterized by the fact that it includes a body, an intermediate assembly component, or adaptor ring extending from the body to the lens assembly of the still camera, said assembly component being made of a removable annular ring, equipped with an outer thread for screwing onto the lens assembly, said ring adapted to being placed in a corresponding area of said body so as to enable a relative rotation movement of said body in relation to said lens assembly, said body also displaying on its side opposite the area of said ring at least one pair of grooves which make it possible to accomodate various photographic accessories, especially filters.

The accessory accommodation grooves are present inside generally parallel, opposite side plates, outwardly offset perpendicular to said body.

In a preferred construction, the area of the body for accommodating the adaptor ring is an annular groove extending around most of a circular aperture insaid body, the size of the groove corresponding to the outer diameter of the adaptor ring, a lug being provided to retain the adaptor ring in the groove while enabling relative rotation between the ring and the body.

The body is also equipped with means enabling the placement of an additional component, especially a sun shade, which preferably is a hollow casing, especially square-shaped with rounded edges.

The present invention is designed to bring refinements to the device summarized above so as to enable especially the assembly, onto a lens of a still camera, of several bodies, making it possible to place on the same lens a greater number of accessories such as filters and/or sun shades, the amount and the relative arrangement of the accessories being altered at will.

This invention also serves to refine the earlier device with respect to the characteristics of the body and the sun shade for placing the latter.

The device according to this invention is characterized mainly in including at least one adapting component which includes on the one hand a first means that enable it to be placed in the groove in the body which normally accommodates the adaptor ring, said first means making possible relative rotation of the adapting component in relation to said body while guaranteeing its lateral immobilization in said body, and on the other hand second means making possible the placement of the adapting component between the grooves in the opposite side plates of the body, said second means enabling sliding displacement in a translation motion of the adapting component in relation to said body.

With such characteristics, it is possible to place on the same lens assembly two bodies separated by one of the adapting components, such adapting component adapted to sliding in relation to the body placed on the lens assembly by way of an adaptor ring, the other body adapted to relative rotation movement in relation to the adapting component, or in relation to the first body and the lens assembly. By multiplying the number of adapting components, which thus each play the role of a turret, one can obviously arrange a corresponding number of bodies successively on the same lens assembly of a still camera.

In a specific construction, the means on said adapting component, enabling its rotation in relation to said body, includes a flange that protrudes radially from said component, and terminating in an end edge, each adapting component thus placed in the groove in a body in the same manner as an adaptor ring.

The means for said adapting component enabling its accommodation between the grooves in the side plates of the body are made of two straight parallel edge faces of the adapting component, formed in the shape of a plate, the spacing of which corresponds to the distance between the bottom of the grooves in the side plates of said body, the thickness of the plate corresponding to the width of said grooves. The adapting component is thus placed in said body in the same manner as an accessory such as a plane filter, the mobility in translation motion of the adapting component in relation to the body thus making possible the alteration of the relative lateral arrangement of two bodies assembled on either side of said adapting component.

According to another characteristic of this invention, the body displays, preferrably on the outer sides of its side plates parts such as protruding clips on which latches of an accessory such as a sun shade can fit through corresponding openings.

This invention also is designed for an accessory such as a sun shade comprised of a hollow casing, preferrably square-shaped with rounded edges including such latches equipped with openings to fit on said body, said sun shades including also in the inner sides of its casing protruding clips similar to those carried by the side plates of said body and allowing affixing of one on the other of two side plates.

Advantageously, the adapting component according to the invention includes also protruding clips similar to those carried by the body and the sun shade and prone to fit inside cavities that form corresponding openings arranged for that purpose in the inner sides of the sun shade casing, opposite to those bearing said protruding clips.

Hence, at will, because of this invention, one can assemble on the same lens, in any desired succession, several bodies each equipped with accessories such as plane or circular filters, and several adapting components and/or sun shades.

Other advantages and characteristics of the invention will surface in the course of the following description of an example by referring to the appended drawing in which:

FIG. 1 represents an exploded view in perspective of the main elements of the device according to the invention.

FIG. 2 is a frontal elevated view of an adapting component for a device according to the invention.

FIG. 3 is a cross view of the adapting component.

FIG. 4 is a rear elevated view of the adapting component.

FIG. 5 is a lateral elevated view of an arrangement example for a two-body assembly.

FIG. 6 is an end view of the arrangement of FIG. 5.

The device according to the invention is comprised of modular components illustrated in FIG. 1.

Among those modular components is a thin body 1 which is roughly hexagonal in shape with rounded corners. For the assembly of the body onto the lens assembly there is an adaptor ring 2, which includes an externally threaded annular radial flange 3 adapted to be screwed onto the threads normally present on lens assemblies for still cameras.

The body 1, which may be a cast body, displays a central circular aperture 4 and on one of its sides an annular-shaped groove 5 which extends around most of the aperture 4, such groove being formed in the outer wall of the body 6.

The body 1 includes in its entry zone of the adaptor ring, inside groove 5, a roughly triangular-shaped lug 7 designed to retain the adaptor ring 2 inside the groove 5 of the body. The groove 5 extends across a little more than a half-circle so as to maintain elastically the adaptor ring 2 which is fitted into it.

The body 1 of the device according to the invention includes also two parallel side plates 8, that face one another, on two opposing sides of the body.

Each of the side plates 8 includes on its inner side a plurality of grooves, each groove on one of the side plates facing one of the grooves in the other side plate.

The side plates 8 display also on their outer sides protruding clips 9, that number four on each cheek in the depicted example, the function of which will be described later.

In FIG. 1 we see, as well as in FIGS. 2 and 4, an adapting component designated overall as 10 in the shape of a roughly rectangular plate displaying two straight sides 11 and 12 brought together by set-backs 13 with two straight sides 14 and 15 each displaying two protruding clips 16 of which the spacing and the size are identical to the spacing and the size of the protruding clips 9 implemented on the outer sides of the side plates 8 of body 1.

The plate that comprises the adapting component 10 includes a central circular aperture 17 defined by a flange 18 which protrudes radially from said component, itself defined by an end edge 19.

The dimensions of the plate that comprises the adapting component 10 are defined to enable cooperation between the adapting component 10 and the body 1 in the following manner.

First of all, the spacing between the straight parallel sides 11 and 12 is defined so as to enable the entry, as well as the sliding in a lateral translation motion, of the adapting component 10 between two grooves facing one another that are arranged in the opposing side plates 8 of the body component 1.

Also the dimensions of the flange 18 and its end edge 19 are selected so as to enable the entry of the adapting component 10 inside the groove 5 of the body 1 in lieu of an adaptor ring 2 and to allow, once the placement is achieved, a relative rotation movement of the adapting component 10 in relation to the body, while preventing lateral movement relative to the lug 7.

Hence one can achieve an assembly arrangement such as the one depicted in FIGS. 5 and 6 where two bodies 1a and 1b are placed on either side of an adapting component 10, the body 1a can be displaced in a translation motion in relation to the adapting component 10, therefore in relation to the body 1b, the latter also adapted to a relative rotation movement in relation to the adapting component 10, therefore to the body 1a. The body 1a can, in turn, be assembled directly on a lens by way of an assembly ring, such as the one depicted in 2 on FIG. 1. We can also anticipate other types of assembly by arranging successively several adapting components, therefore several bodies.

As depicted in FIG. 1 the device according to the invention includes as another modular component a sun shade designated universally as 20 formed as a hollow casing, made in one sequence, that is roughly square-shaped with rounded edges.

The sun shade 20 includes in the extension of two of those opposing sides, latches 21 that each display openings 22, of which the size and spacing correspond to the size and spacing of the protruding clips 9 and 16, carried respectively by the side plates 8 of the body 1 and by the adapting component 10. Because of the cooperation between such protruding clips and such openings it is possible according to the invention to assemble a sun shade onto the body as depicted especially in FIG. 5 or else to assemble the sun shade on an adapting component 10.

In addition, within two inner opposing sides of the sun shade 20 are protruding clips 23 which enable assembly of one on the other of two sun shades by engaging the clips 23 of one sun shade in the openings 22 of the other shade.

Furthermore, it is advantageous to equip the sun shade in its two inner sides opposite those bearing the protruding clips 23 with openings, of which the spacing and size correspond to the openings 22 of the outer latches of the sun shade. Hence one can place directly a sun shade onto an adapting component or on a body either by way of those openings in the inner side or by way of openings 22 on the outer latches.

In view of what has just been described as concerns the various possibilities for assembling those components one in relation to another, one must understand that the assembly example of FIGS. 5 and 6, only illustrates a variation among many others, the number of those components and their relative arrangement can be multiplied at will according to the demands of snapshots, in relation especially to the number of filters or sun shade that the photographer wishes to use.

I claim:

1. An accessory-holding device for a still camera having a lens assembly, including a body, an intermediate assembly component from the body onto the lens assembly of the still camera, said assembly component made of a removable annular adaptor ring, equipped with an outer thread for screwing onto the lens assembly, said adaptor ring adapted to being placed inside a corresponding area of said body so as to allow for a relative rotation movement of said body in relation to said lens assembly, said body also displaying, on its side opposite the adaptor ring, said plates having therein at least one pair of grooves making it possible to accommodate a photographic accessory, characterized by the fact that said device includes at least one adapting component including on the one hand first means for its placement in said corresponding area inside said body to accommodate the adaptor ring, said first means enabling a relative rotation of the adapting component in relation to said body while ensuring its lateral immobilization inside said body, and on the other hand second means for placing the adapting component between the grooves facing the opposing side plates of the body, said second means enabling sliding displacement in translation motion of the adapting component in relation to said body.

2. A device according to claim 1, characterized by the fact that said first means includes a flange that protrudes radially from said component, terminating in an end edge.

3. A device according to any of the claims 1 and 2, characterized by the fact that the adapting component is shaped like a plate and said second means includes two straight parallel side edges of the adapting component, of which the spacing corresponds to the distance between the bottom of the grooves facing the side plates of said body, and of which the thickness corresponds to the width of said grooves.

4. A device according to claim 1, characterized by the fact that the body displays on the outer sides of its side plates protruding clips on which latches belonging to an accessory can be fitted through corresponding openings.

5. A device according to claim 1, characterized by the fact that the adapting component includes protruding clips on which latches belonging to an accessory can be fitted by way of corresponding openings.

6. An accessory-holding device for a camera comprising an annular body having an aperture therethrough and having on one side a recess extending in a plane transverse to the plane of the aperture for receiving an edge of an adaptor ring adapted to be screwed into a lens assembly in such a way as to permit rotation of the body relative to the adaptor ring, the body also having at least one pair of grooves, on its side which is opposite the recess, these grooves extending in a plane transverse to the plane of the aperture; and an adapting component having an aperture therethrough, said adapting component having first means for engaging in the recess so as to be held therein with said apertures in alignment, said first means enabling rotation of the adapting component about the axis of the aligned apertures, and said adapting component having second means for engaging in said pair of grooves so as to be held therein, said second means enabling sliding movement of the adapting component transversely of the axis of the apertures.

7. A device as in claim 6 wherein said adapting component is a plate having a pair of parallel edges forming said second means, said first means being formed by an annular flange surrounding the aperture in said component.

* * * * *